Dec. 14, 1948.  J. ENSINK  2,456,494
CIRCUIT ARRANGEMENT FOR THE MODULATION
OF ELECTRICAL OSCILLATIONS
Filed Feb. 11, 1947
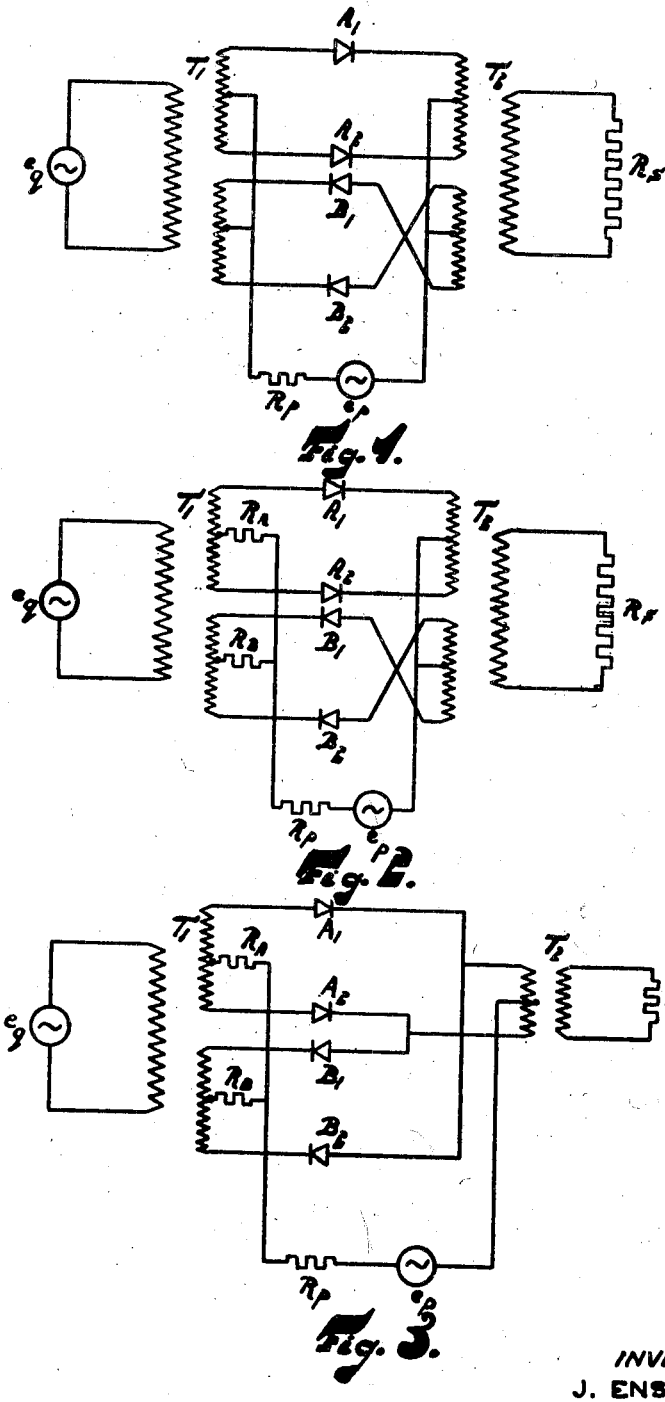
INVENTOR
J. ENSINK
BY
AGENT Patented Dec. 14, 1948

2,456,494

UNITED STATES PATENT OFFICE 2,456,494

CIRCUIT ARRANGEMENT FOR THE MODULATION OF ELECTRICAL OSCILLATIONS

Johannes Ensink, Eindhoven, Netherlands, assignor to Hartford National Bank and Trust Company, Hartford, Conn., as trustee Application February 11, 1947, Serial No. 727,780
In the Netherlands March 29, 1944

Section 1, Public Law 690, August 8, 1946
Patent expires March 29, 1964

3 Claims. (Cl. 332—43)

This invention relates to a circuit-arrangement for the modulation of electrical oscillations, comprising a double push-pull connection of rectifiers, the direction in which the current passes in the rectifiers of one push-pull connection being opposite to that of the others and the carrier-wave generator producing the oscillations to be modulated being connected between the electric centres of each of the two push-pull connections. Such a circuit-arrangement, which is referred to as a double push-pull modulator is represented in Fig. 1 of the drawing and comprises two push-pull connnections of rectifiers $A_1$, $A_2$ and $B_1$, $B_2$ respectively which are connected through transformers $T_1$ and $T_2$ respectively to the input circuit, to which the modulating oscillations, represented by a source of potential producing a voltage $e_q$ are supplied, and to the output circuit, represented by a load resistance $R_s$, from which the modulated oscillations are obtained. The electric centres of the secondary windings of the input transformer $T_1$ and of the primary windings of the output transformer $T_2$ are respectively connected to one another and, moreover, to a carrier wave generator, represented by a source of potential $e_p$ having an internal resistance $R_p$.

The voltage $e_q$ may be a low-frequency voltage or a high-frequency voltage, which is to be demodulated or mixed with the carrier wave $e_p$.

The operation of this circuit-arrangement is known, so that a further description thereof is superfluous.

The double push-pull modulator has the following disadvantage. In a given phase of the carrier wave voltage $e_p$ the rectifiers $A_1$ and $A_2$ are caused to open and a voltage drop $e_A$ having the carrier-wave frequency ensues through them. The same voltage $e_A$ is set up as a blocking voltage $e_B$ across the rectifiers $B$. In the case of the rectifiers having an ideal characteristic, that is to say an infinitely high resistance in the blocking direction and an infinitely low resistance in the direction in which the current passes, the voltage $e_A$ and consequently also the blocking voltage across the rectifiers B would become zero. As the device can only work as a modulator as long as the modulating voltage $e_q$ is not sufficiently high to reopen the blocked rectifiers B this means that the modulator, equipped with ideal rectifiers, could not operate as a modulator.

The rectifiers utilized in practice are not ideal. The resistance in the direction in which the current passes has an infinitely low value, so that a blocking voltage is steadily set up at the rectifiers, which have to be blocked during a given phase of the carrier-wave voltage $e_p$, so that the modulator can operate. Nevertheless this blocking voltage $e_B$ remains low. It is determined by the ratio between the resistance $r$ of the rectifiers in the direction in which the current passes and the mostly much higher internal resistance $R_p$ of the carrier wave generator $$e_B = \frac{\frac{r}{2}}{\frac{r}{2} + R_p}$$

If the amplitude of the modulating oscillations $e_q$ becomes higher than the blocking voltage $e_B$ the rectifiers which should actually be blocked, also become conductive, as a result of which the two push-pull connections now cause a current to flow in the common load resistance $R_s$. Since these currents have opposite directions a decrease of the resulting modulated output current or output voltage respectively occurs or, in other words, the modulator has a limiting effect. This limiting effect is sometimes desired, for example in carrier-wave telephony systems, in which modulators of the aforesaid kind are used and in which it is desirable to prevent the modulated signal from exceeding a definite maximum value.

In other cases, on the contrary, a limiting effect of the modulator is undesirable in conjunction with the undesirable modulation products produced by the limitation.

Now the object of the invention is to render the point, at which the limiting effect of the double push-pull modulator begins, adjustable at will.

According to the invention this object is achieved by inserting in at least one of the leads connecting the carrier-wave generator to an electric centre of each of the push-pull connections an impedance for at least the frequency of the oscillations to be modulated.

Fig. 2 of the drawing represents a circuit-arrangement according to the invention. It corresponds to the circuit-arrangement shown in Fig. 1, but a lead connecting the carrier-wave generator to the push-pull connection comprising the rectifiers $A_1$ and $A_2$ includes a resistance $R_A$ and the lead connecting the carrier wave generator to the push-pull circuit-arrangement comprising the rectifiers $B_1$ and $B_2$ includes a resistance $R_B$. The blocking voltage $e_B$, which is now set up at the blocked rectifiers, assuming these to be the rectifiers $B_1$ and $B_2$, is approximately $$e_B = \frac{R_A + \frac{r}{2}}{R_A + R_p + \frac{r}{2}} e_p$$

and can thus be adjusted by the choice of the resistance $R_A$. The same expression holds in regard to the blocking voltage set up at the rectifiers $A_1$ and $A_2$ during the time when the rectifiers $B_1$ and $B_2$ are conductive. Since the value of the blocking voltage $e_B$ determines the point at which the limiting effect of the modulator begins, it is evident that by adjustment of the resistance $R_A$ this point is adjustable. If the rectifiers have the same characteristics the resistances $R_A$ and $R_B$ can be chosen equal. In the opposite case they will have to be somewhat different, in order to ensure that the blocking voltages of the rectifiers of the two push-pull halves are equal.

Fig. 3 of the drawing shows a simplified modulator of the double push-pull type, in which use is made of an output transformer $T_2$ having a single primary winding. In this case the resistances $R_A$ and $R_B$ are connected in the same manner as in the modulator shown in Fig. 2.

What I claim is:

1. A circuit arrangement for modulating electric oscillations, comprising a double push-pull balanced modulator having a plurality of rectifiers arranged to cooperate in pairs, one of said pairs being connected in phase opposition with respect to the other, means to apply the electric oscillation to be modulated in the same phase to each of the pairs of rectifiers of said modulator, means to apply a modulating oscillation voltage to the rectifiers of said modulator in phase opposition to each of the pairs of rectifiers of said modulator to modulate said electric oscillation, and a circuit element having appreciable impedance at the frequency of said oscillation interposed between said means to apply said electric oscillation and each of said pairs of rectifiers.

2. A circuit arrangement for modulating electric oscillations, comprising a double push-pull balanced modulator having a pair of electrical paths comprising an input winding, a pair of rectifiers and an output winding, each of said windings having a center tapping thereon, means to apply the electric oscillation to be modulated between the center tappings of said input and said output windings, means to apply a modulating oscillation voltage to the input windings of said modulator in phase opposition to each of said electric paths of said modulator to modulate said electric oscillation, circuit elements having appreciable impedance at the frequency of said electric oscillation interposed between said means to apply said electric oscillation and each of the center tappings of said windings, and means to couple a load element to the output winding of said electric paths.

3. A circuit arrangement for modulating electric oscillations, comprising a double push-pull balanced modulator having a pair of electrical paths each of which comprises an input winding, a pair of rectifiers and an output winding, each of said windings having a center tapping thereon, one of said paths being connected in phase opposition with respect to the other, means to apply the electric oscillation to be modulated in phase between the center tappings of the input and said output windings of each of said paths, means to apply a modulating oscillation voltage to the input windings of said modulator in phase opposition to each of said electric paths of said modulator to modulate said electric oscillation, circuit elements having appreciable impedance at the frequency of said electric oscillation interposed between said means to apply said electric oscillation and each of the center tappings of the input windings of each of said paths, and means to couple a load element in phase opposition to said output windings.

JOHANNES ENSINK.

REFERENCES CITED

The following references are of record in the file of this patent:

FOREIGN PATENTS

| Number | Country | Date |
|--------|---------|------|
| 484,883 | Great Britain | May 11, 1938 |
| 521,313 | Great Britain | May 17, 1940 |
| 544,406 | Great Britain | Apr. 13, 1942 |